United States Patent [19]

Taniguchi

[11] Patent Number: 4,909,603

[45] Date of Patent: Mar. 20, 1990

[54] LIQUID CRYSTAL DISPLAY ELEMENT

[75] Inventor: Kouki Taniguchi, Osaka, Japan

[73] Assignee: Sharp Kabushiki Kaisha, Osaka, Japan

[21] Appl. No.: 167,322

[22] Filed: Mar. 11, 1988

[30] Foreign Application Priority Data

Mar. 14, 1987 [JP] Japan ............................. 62-37290[U]

[51] Int. Cl.$^4$ ............................................. G02F 1/133
[52] U.S. Cl. ................................... 350/337; 350/339 F
[58] Field of Search ............................ 350/339 F, 337

[56] References Cited

U.S. PATENT DOCUMENTS

| | | | |
|---|---|---|---|
| 4,506,956 | 3/1985 | Dir .................................. | 350/339 F |
| 4,593,977 | 6/1986 | Takamatsu et al. ............. | 350/339 F |
| 4,596,446 | 6/1986 | Waters et al. ....................... | 350/346 |
| 4,632,514 | 12/1986 | Ogawa et al. ................... | 350/339 F |
| 4,639,088 | 1/1987 | Suginoya et al. ................ | 350/339 F |
| 4,653,861 | 3/1987 | Kando et al. ....................... | 350/337 |

FOREIGN PATENT DOCUMENTS 0023421 2/1981 European Pat. Off. .
0179922 5/1986 European Pat. Off. .

*Primary Examiner*—Stanley D. Miller
*Assistant Examiner*—Anita Pellman Gross

[57] ABSTRACT

A liquid crystal display element in which a liquid crystal layer is interposed between a pair of electrodes. At least one of the electrodes is light shielding. The liquid crystal display element utilizes a polarized light absorption axis for a pair of polarizers which are arranged on the respective side of the liquid crystal layer. The positioning of the polarizers is selected so that the angle of polarized light causes the liquid crystal layer to have a light shielding quality when no voltage is applied across the pair of electrodes.

4 Claims, 5 Drawing Sheets

LIQUID CRYSTAL DISPLAY ELEMENT

BACKGROUND OF THE INVENTION

The present invention relates to a liquid crystal display element, and more particularly, to a liquid crystal display element which is suitably used in an apparatus used for display purposes.

FIG. 6 is a cross sectional view which schematically illustrates the construction of a liquid crystal display element 1 according to a prior art device and FIG. 7 is a plan view of this device.

With reference to FIG. 6, in the liquid crystal display element 1, on one of its surfaces, which may be realized by a pair of glass sheets are placed, light transmissive insulated substrates 2 and 3, which may be realized by indium oxide (ITO), and orientation films 7 and 8, which may be realized by polyimido. These glass sheets are laminated with the substrates and films and arranged opposedly, with each film surface of the orientation films 7 and 8 being disposed on the inside of the glass sheets. On one surface of the light transmissive insulated substrates 2 and 3 are placed transparent electrodes 4 and 5 which may be realized by indium oxide (ITO). The electrodes are formed into a plurality of belt-shaped forms, and are covered with interlaminar insulated films 2a and 3a. Sealing members 10a and 10b are interposed between the orientation films 7 and 8. The orientation films are provided with a rubbing treatment so that a liquid crystal molecule 6 is caused to be oriented along one axis with respect to the face to the transparent electrodes 4 and 5. Also, the thickness of the liquid crystal layer 9 which is injected with the liquid crystal molecule 6 is maintained at a constant thickness, and the liquid crystal molecule is sealed inside the device. As a result of this, a liquid crystal cell 11 is formed. A pair of polarizers 12 and 13 are installed to standwich the liquid crystal cell 11 so that, as will be described later, the rubbing angle, which is determined in advance, is formed by the polarized axis of the polarizer and the orientation film when these elements are caused to face each other in a predetermined direction. With respect to the liquid crystal display element, a light source L is irradiated from the back side of the liquid crystal device, as shown in FIG. 6, in a direction indicated by the arrow, that is, in the direction of the upper surface of the liquid crystal device.

With reference to FIG. 7, by sandwiching a liquid crystal layer which is not shown in the diagram, the transparent electrodes 4a, 4b, 4c, . . . , and 4M formed into a plurality of belt-shaped forms (M=1, 2, 3, . . . when general indication of the electrodes 4m is by used as a reference symbol) and the other transparent electrodes 5a, 5b, 5c, . . . , 5N (N=1, 2, 3, . . . when general indication of the electrodes 5N is used as the reference symbol are arranged to intersect at right angles. One of the transparent electrodes which intersect at right angles is generally called a horizontal electrode 4, and the other of the transparent electrodes which intersect at right angles is generally called a vertical electrode 5. 15a, 15b, 15c, . . . are the square portions generated at the intersections of the two electrodes 4 and 5 and are generally called the picture element 15. The liquid crystal layer which is not shown in the diagram is included. Therefore, on the front of the display element 1, the display image 14 is formed by M×N pieces of the picture element 15, and a plurality of spaces 16 which is a non-electrode portion existing around an individual picture element 15. In the display image 14, when a voltage is applied across the horizontal electrode 4 and the vertical electrode 5, the picture element 15 at the intersection of the two electrodes lets the light from the light source not shown in the diagram of FIG. 7 to transmit or demonstrate an optical behavior. This optical behavior transmits or shields the light from the light source which is not shown in the diagram.

FIG. 8 is a diagram which shows the absorption axis a1 of the back side polarizer 12 and the rubbing direction b1 of the back side orientation film 7 according to the prior art, and FIG. 9 is a diagram which shows the absorption axis a2 of the surface side polarizer 13 and the rubbing direction b2 of the surface side orientation film 8. As shown in FIG. 8 and FIG. 9, the angle between the absorption axis direction a1 of the back side polarizer 12 and the rubbing direction b1 of the back side orientation film 7 and the angle between the absorption axis direction a2 of the surface side polarizer 13 and the rubbing direction b2 of the surface side orientation film 8 are 45° respectively. The absorption axis direction a2 of the surface side polarizer 13 is rotated 60° in clockwise direction with respect to the absorption axis direction a1 of the back side polarizer 12. In the case where the rubbing directions of the orientation films 7 and 8 and the absorption axis directions of the polarizers 12 and 13 are arranged to oppose each other in a manner such as above, the liquid crystal display unit 1 becomes a bright state when no voltage is applied, while the liquid crystal display unit 1 becomes a dark state and the light is shielded when a voltage is applied.

With reference to FIG. 6 and FIG. 7 again, although the actual position of the picture element 15 shields the light from the light source L when a voltage is applied, the space 16 around the aforementioned picture element 15 is not applied with voltage. Therefore, an inconvenient phenomenon occurs in which the light leaks from this space, causing the contrast of the display screen to weaken. And, in particular, in the case of the color liquid crystal display element in which the color filter is inserted into the liquid crystal cell, there is an inconvenience in which the purity of the display color is reduced together with the contrast.

In order to solve these problems in the prior art, a method was used wherein the space 16 is provided with what is called the black matrix printing so as to fill the space thereby preventing the light from leaking. Also a method was used wherein the thin film transistors for driving which are not shown in the diagram are caused to correspond on a one to one basis to individual picture element 15 so as to be connected by forming a metal wiring which is not shown in the diagram in the space 16 around the picture element 15, so that the metal wiring section is made of a light shielding material.

However, in order to prevent the light leakage from the above-mentioned space 16 and to realize the desired effect, it requires a number of materials and complicated processes as stated above, and further the yield is poor and an increase in production cost is unavoidable. Therefore, a liquid crystal display element whereby the light leakage prevention is realized through simple processes and reduced costs has been realized in the prior art.

SUMMARY OF THE INVENTION

An objective of the present invention is to provide a liquid crystal display element which solves the above-mentioned technical problems by simple means.

The present invention is designed to provide a liquid crystal display element in which a liquid crystal layer is interposed between a pair of electrodes. At least one of these electrodes is light transmissive. The present invention further contemplates that the polarized light absorption axis of a pair of polarizers which are respectively arranged on both sides of the above-mentioned liquid crystal layer is selected to have the axial direction of the polarized light absorption axis so that the liquid crystal layer has a light shielding quality when a voltage is not applied across the aforementioned electrodes.

According to the present invention, a pair of light transmissive electrodes and the polarizers are arranged oppositely on both sides of the liquid crystal layer, and the axis of the polarized light absorption axis of one polarizer is installed at a predetermined angle with respect to the other polarizer so that the liquid crystal layer has a light shielding quality when a voltage is not applied across the above-mentioned electrodes, thereby the light is shielded when a voltage is not applied across the above-mentioned electrodes.

BRIEF DESCRIPTION OF THE DRAWINGS

The present invention will become more fully understood from the detailed description given below and the accompanying drawings which are given by way of illustration only, and thus are not limitative of the present invention and wherein.

DESCRIPTION OF THE PREFERRED EMBODIMENT

Figure 1:
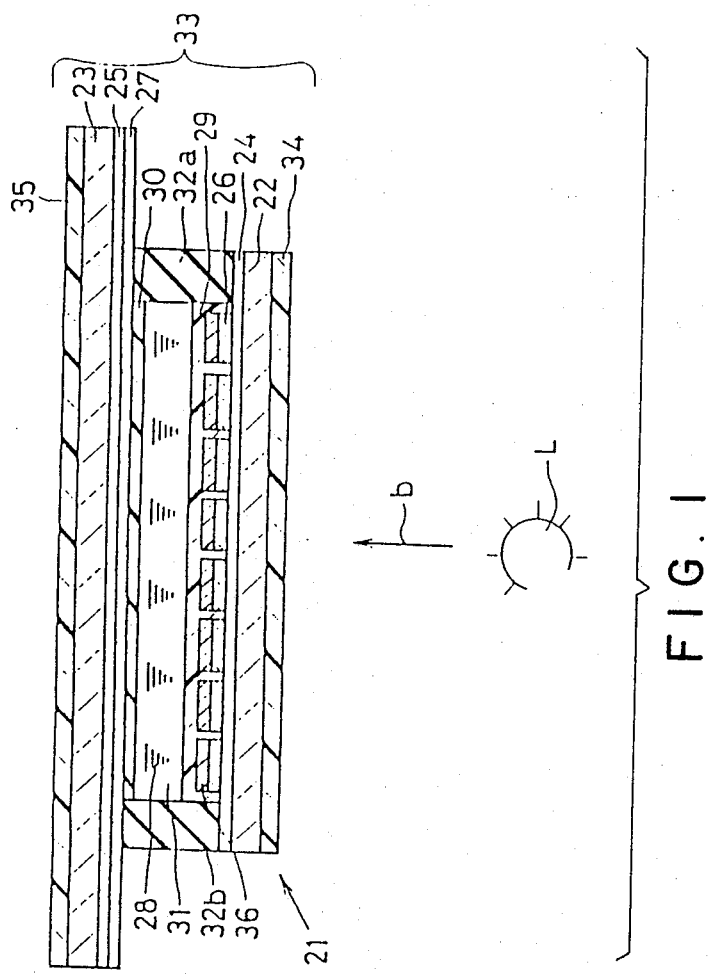
FIG. 1 is a cross sectional view showing a construction of a color liquid crystal display element of an embodiment of the present invention.

FIG. 1 is a cross sectional view showing a construction of a liquid crystal display element 21 of an embodiment of the present invention. On one surface of the liquid crystal display element, light transmissive insulated substrates 22 and 23 which may be realized by a pair of glass sheets are formed. Light transmissive insulated films 24 and 25 which may be realized by silicon oxide ($SiO_2$) and transparent electrodes 26 and 27 formed in a plurality of belt-shaped forms and which may be realized by indium oxide (ITO) are formed on the glass sheets. A liquid crystal molecule 28 may be realized by polyimido and orientation films 29 and 30 which are provided with the rubbing processes. The above components are caused to be oriented with respect to one axis of the surfaces of the above-mentioned electrodes. The elements are laminated in the above-mentioned order and are arranged oppositely with the orientation films 29 and 30 being disposed to be inside. Sealing members 32a 32b are interposed between the above-mentioned orientation films 29 and 30 to maintain a constant thickness of the liquid crystal layer 31 which is injected with the liquid crystal molecule 28 and to seal the liquid crystal molecule 28. Consequently, a liquid crystal cell 33 is formed. Further, a pair of polarizers 34 and 35 are installed on both sides of the liquid crystal cell 33 so that the polarized light axes of the polarizers are disposed mutually in a predetermined direction. Furthermore, a color filter 36 for color display is positioned and placed on the back side transparent electrode 26 so that one specified color of the three colors of red, green, or blue is caused to overlap corresponding to the picture element. With respect to the liquid crystal display element 21 having a laminar construction described above, the light source L is irradiated from the back side (as shown in FIG. 1) into a direction indicated by the arrow b, that is, in the direction of the upper surface side.

Figure 2:
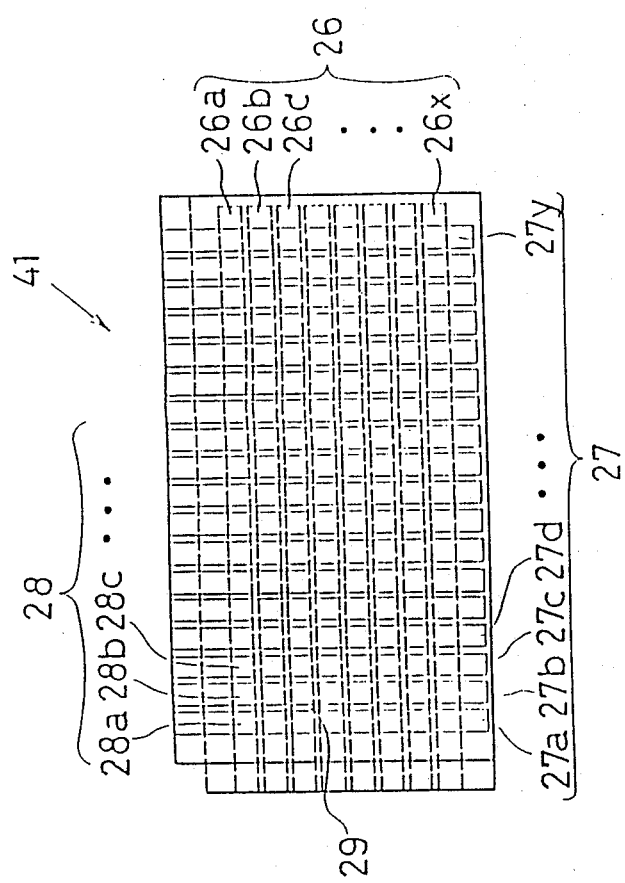
FIG. 2 is a plan view thereof.
Figure 3:
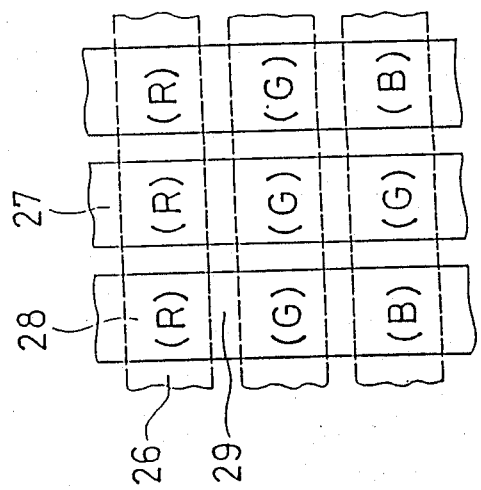
FIG. 3 is a diagram showing an enlarged part thereof.

FIG. 2 is a plan view showing a basic construction of a display screen 41 which uses the liquid crystal display element of an embodiment of the present invention, and FIG. 3 is a diagram showing an enlarged part thereof. In FIG. 2 and FIG. 3, the portions corresponding to those shown in the above FIG. 1 are provided with the same reference symbols. One of the transparent electrodes 26a, 26b, 26c, . . . , 26X which is formed into a plurality of belt-shaped forms indicated by 26 when referred to generally and the other transparent electrodes 27a, 27b, 27c, . . . , 27Y indicated by 27 when referred to generally, are arranged to intersect each other. One of the two intersecting transparent electrodes is generally called the horizontal electrode 26, and the other electrode is generally called the vertical electrode 27. The square portions 37a, 37b, 37c, . . . generated at the intersection of the two electrodes 26 and 27 are generally called the picture element 37. The liquid crystal layer, which is not shown in the diagram, is included. Therefore, the display screen 41 is composed of X×Y pieces of the picture element 37 and the picture element 37 is developed in either of the three colors of red, green, and blue by the above-mentioned color filters. Further, around each individual picture element 37, there exists the space 29 in lattice state having no electrode.

Figure 4:
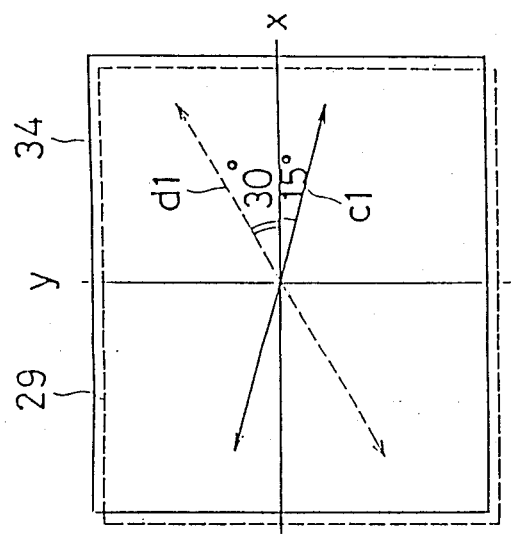
FIG. 4 is a diagram showing an arrangement of a back side orientation film and a back side polarizer of the color liquid crystal display unit according to an embodiment of the present invention.
Figure 5:
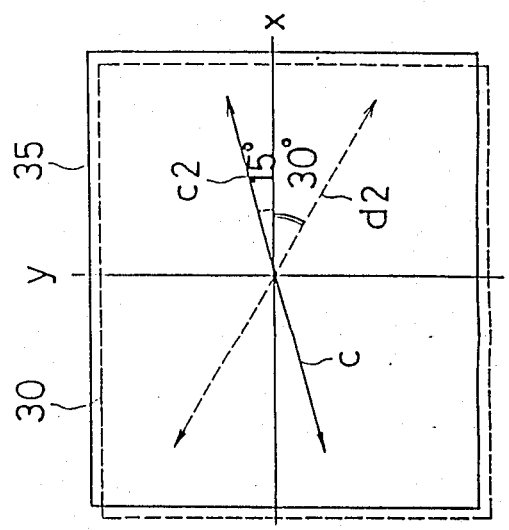
FIG. 5 is a diagram showing an arrangement of a surface side orientation film and a surface side polarizer of the same color liquid crystal display unit of an embodiment of the present invention.
Figure 6:
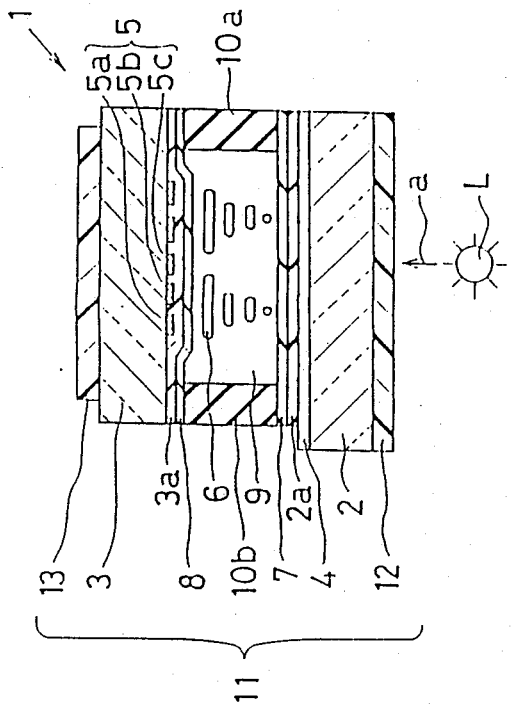
FIG. 6 is a cross sectional view which schematically shows a construction of a liquid crystal display element according to the prior art.
Figure 7:
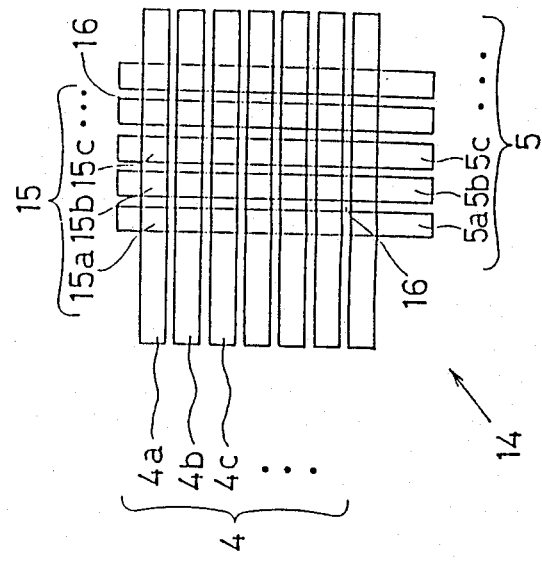
FIG. 7 is a plan view showing a basic construction of a display unit 14 which uses the liquid crystal display unit according to the prior art.
Figure 8:
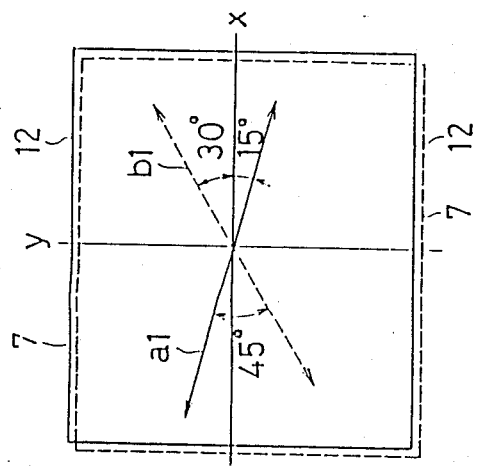
FIG. 8 is a diagram which shows the absorption axis of the back side polarizer and the rubbing direction of the back side orientation film according to the prior art.

FIG. 4 is a diagram showing an arrangement of the back side orientation film 29 and the back side polarizer 34 of the color liquid crystal display element 21 of one embodiment of the present invention, and FIG. 5 is a diagram showing an arrangement of the surface side orientation film 30 and the surface side polarizer 35. As shown in FIG. 4 and FIG. 5, the angle between the absorption axis direction c1 and the rubbing direction d1 of the back side polarizer 34 and the angle between the absorption axis direction c2 and the rubbing direction d2 of the surface side polarizer 30 are 45 degrees, respectively. The absorption axis direction c2 of the surface side polarizer 30 is rotated 30 degrees in a clockwise direction with respect to the absorption axis direction c1 of the back side polarizer 29.

Figure 9:
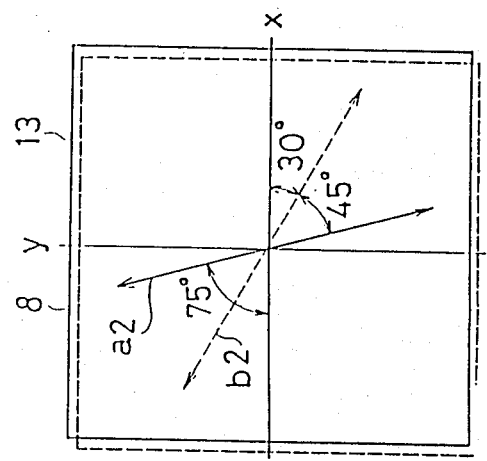
FIG. 9 is a diagram which shows the absorption axis of the surface side polarizer and the rubbing direction of the surface side orientation film of the same prior art.

When FIG. 5 which is another embodiment of the present invention is compared with FIG. 9 shown above which is the prior art, the absorption axis direction c1 of of the surface side polarizer 30 shown in FIG. 5 is rotated 90 degrees in counterclockwise direction with respect to the absorption axis direction a2 of the surface side polarizer 13 shown in FIG. 9. In the case where the rubbing directions d1 and d2 of the orientation films 29 and 30 and the absorption axis directions c1 and c2 of the polarizer 34 and 35 are arranged to oppose each other, the liquid crystal display becomes what is called the negative type (normally black) which does not transmit the light when no voltage is applied and only transmits the light when a voltage is applied. In addition, the spaces 29 do not transmit the light at all in either case. Therefore, in a color liquid crystal display unit 21 of this embodiment, when the picture element 37 corresponding to the intersection of the transparent electrode is applied with voltage, the picture element becomes light transmissive and develops the color according to the color of the color filter which is arranged corresponding to the picture element 37. Therefore, an inconvenient phenomenon such as light leakage is prevented, while the contrast of the picture element 37 is enhanced, thereby improving the purity of the display color.

In the embodiment described above, the color filter 36 is inserted on the back side transparent electrode 24 to make the color display possible. However, it is undoubtedly possible to realize an arrangement for monochrome display from which the color filter is omitted, and in this case, the display screen does not transmit the light when no voltage is applied whereas the picture element when applied with voltage transmits the light, and the display status of what is called the normally black is achieved.

In the embodiment stated above, although the light source is arranged at the back side of the display screen, the light source may comprise what is called a reflecting type by laminating further the reflecting plate on the back side polarizer to cause the light irradiated into the display screen to reflect on the above-mentioned reflecting plate so as to obtain the display by the reflected light from the reflecting plate. By this arrangement, it is possible to utilize an external light as a light source and to reduce the thickness of the display screen.

According to the present invention as described above, because a liquid crystal layer exists between a pair of electrodes where at least one electrode is light transmissive and the axial direction of a polarized light absorption axis for a pair of polarizers arranged respectively on both sides of the above-mentioned liquid crystal layer is selected so as to have light transmitting quality when a voltage is applied between the aforementioned electrodes, the light is shielded when no voltage is applied between the electrodes. Therefore, the light leakage from the space where no voltage is applied is prevented and a high grade liquid crystal display element with remarkably improved purity of the display color is realized. Consequently, a clear display screen with excellent screen contrast quality is realized at the same-production cost as that of the prior art.

While only certain embodiments of the present invention have been described, it will be apparent to those skilled in the art that various changes and modifications thus may be made therein without departing from the spirit and scope of the present invention as claimed.

What is claimed is:

1. A liquid crystal display comprising:
   first and second light transmissive substrates;
   a liquid crystal layer interposed between said substrates;
   a pair of electrodes, formed respectively on only portions of first and second substrates adjacent said liquid crystal layer at least one of said electrodes being light transmissive;
   a pair of polarizers arranged respectively on both sides of said liquid crystal layer, each polarizer having an absorption axis; and
   said polarizers being configured such that said absorption axes of said polarizers form a first angle corresponding to an angle of polarized light, said first angle formed by said absorption axes causing said liquid crystal layer to have a light shielding quality when no voltage is applied across said pair of electrodes;
   orientation layers formed on each said substrate and each having a rubbing direction; each polarizer has an absorption axis direction;
   said absorption axis direction of a back polarizer of said pair of polarizers and said rubbing direction of the respective orientation layer forming a second angle;
   said absorption axis direction of a surface polarizer of said pair of polarizers and said rubbing direction of the respective orientation layer forming a third angle;
   said second and third angles each being substantially 45 degrees;
   said absorption axis direction of said surface polarizer being rotated 30 degrees in a clockwise direction with respect to said absorption axis direction of said back polarizer.

2. The liquid crystal display as set forth in claim 1, further comprising a color filter positioned on a back side of the transparent electrode, thereby causing a color display.

3. A liquid crystal display, comprising:
   first and second light transmissive substrates;
   a light source;
   at least one pair of opposed electrodes, each electrode being formed on only a portion of said respective first and second substrates, at least one of said pair of electrodes being light transmissive;
   a liquid crystal material being positioned between said substrates and said pair of electrodes;
   a pair of polarizers, each polarizer being positioned on said electrode adjacent said liquid crystal material, each polarizer having a polarized light absorption axis, said polarized light absorption axis having a first predetermined angle with respect to each other;
   orientation layers, each orientation layer being positioned adjacent said polarizer each orientation layer having a rubbing direction; each rubbing direction forming a second predetermined angle with respect to said polarized light absorption axis;
   voltage means, operatively connected to said electrodes, for regulating an application of a voltage to said intersection of said electrodes; and
   said liquid crystal material, said orientation layers, and said pair of polarizers allowing substantially no light from said light source to be transmitted through the liquid crystal display when said voltage means causes no voltage to be applied to said intersection;

color filter means, positioned on the transmissive electrode, for providing color to the light from said light source.

4. The liquid crystal display as claimed in claim 3, wherein said second predetermined angles between said polarized light absorption axis and said rubbing direction of respective orientation layer is 45 degrees; wherein said polarized light absorption axis of said surface polarizer is rotated 30 degrees in a clockwise direction with respect to said polarized light absorption axis of said back polarizer.

* * * * *